United States Patent
Hukerikar et al.

(10) Patent No.: US 11,874,742 B2
(45) Date of Patent: Jan. 16, 2024

(54) TECHNIQUES FOR RECOVERING FROM ERRORS WHEN EXECUTING SOFTWARE APPLICATIONS ON PARALLEL PROCESSORS

(71) Applicant: NVIDIA CORPORATION, Santa Clara, CA (US)

(72) Inventors: Saurabh Hukerikar, Santa Clara, CA (US); Nirmal Raj Saxena, Los Altos Hills, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 174 days.

(21) Appl. No.: 17/237,376

(22) Filed: Apr. 22, 2021

(65) Prior Publication Data
US 2022/0342761 A1   Oct. 27, 2022

(51) Int. Cl.
G06F 11/14   (2006.01)
G06F 9/38    (2018.01)
G06F 9/30    (2018.01)
G06F 11/07   (2006.01)

(52) U.S. Cl.
CPC ...... *G06F 11/1407* (2013.01); *G06F 9/30101* (2013.01); *G06F 9/3861* (2013.01); *G06F 11/0772* (2013.01); *G06F 11/1438* (2013.01)

(58) Field of Classification Search
CPC . G06F 11/1407; G06F 9/30101; G06F 9/3861
See application file for complete search history.

(56) References Cited

U.S. PATENT DOCUMENTS

| 6,654,781 B1* | 11/2003 | Browning | G06F 9/4843 711/170 |
| 2005/0081020 A1* | 4/2005 | Volp | G06F 12/1036 712/228 |
| 2007/0277056 A1* | 11/2007 | Varadarajan | G06F 11/1469 714/15 |
| 2011/0066879 A1* | 3/2011 | Nakai | G06F 8/63 718/1 |

(Continued)

FOREIGN PATENT DOCUMENTS

WO   WO-2022139795 A1 *   6/2022

OTHER PUBLICATIONS

Takizawa et al., "CheCUDA: A Checkpoint/Restart Tool for CUDA Applications", 2009 International Conference on Parallel and Distributed Computing, Applications and Technologies, DOI 10.1109/PDCAT.2009.78, 2009, pp. 408-413.

(Continued)

*Primary Examiner* — Joseph O Schell
(74) *Attorney, Agent, or Firm* — Artegis Law Group, LLP

(57) ABSTRACT

In various embodiments, a software program uses hardware features of a parallel processor to checkpoint a context associated with an execution of a software application on the parallel processor. The software program uses a preemption feature of the parallel processor to cause the parallel processor to stop executing instructions in accordance with the context. The software program then causes the parallel processor to collect state data associated with the context. After generating a checkpoint based on the state data, the software program causes the parallel processor to resume executing instructions in accordance with the context.

20 Claims, 5 Drawing Sheets

(56) References Cited

U.S. PATENT DOCUMENTS

| | | | | |
|---|---|---|---|---|
| 2013/0124838 A1* | 5/2013 | Shah | .................... | G06F 9/461 |
| | | | | 712/234 |
| 2013/0247069 A1* | 9/2013 | Chen | .................. | G06F 11/1402 |
| | | | | 718/107 |
| 2016/0026494 A1* | 1/2016 | Rauchfuss | ............. | G06F 9/461 |
| | | | | 710/308 |
| 2016/0092225 A1* | 3/2016 | Collura | ................ | G06F 9/3851 |
| | | | | 712/228 |
| 2021/0224072 A1* | 7/2021 | Goodman | ........... | G06F 9/30032 |

OTHER PUBLICATIONS

Nukada et al., "NVCR: A Transparent Checkpoint-Restart Library for NVIDIA CUDA", 2011 IEEE International Parallel & Distributed Processing Symposium, DOI 10.1109/IPDPS.2011.131, May 16-20, 2011, pp. 104-113.

* cited by examiner

TECHNIQUES FOR RECOVERING FROM ERRORS WHEN EXECUTING SOFTWARE APPLICATIONS ON PARALLEL PROCESSORS

GOVERNMENTAL RIGHTS

This invention was made with Government support under DOE Contract No. DE-AC52-07NA27344 and Lawrence Livermore National Laboratory Subcontract No. B620719. The Government has certain rights in this invention.

BACKGROUND

Field of the Various Embodiments

The various embodiments relate generally to parallel processing systems and, more specifically, to techniques for recovering from errors when executing software applications on parallel processors.

Description of the Related Art

Parallel processors are capable of very high processing performance using a large number of threads executing in parallel on dedicated programmable hardware processing units. Some parallel processors provide programming platform software stacks that enable software applications executing under the control of a primary processor or "host" to access a parallel processor or "device" as a black box via calls to one or more application programming interfaces ("APIs"). Such software applications typically make API calls to allocate, deallocate, and copy device memory, transfer data between host memory and device memory, invoke or "launch" sets of instructions known as "kernels" that execute on the parallel processor, and so forth.

While these types of software applications execute, transient primary processor faults and transient parallel processor faults as well as other transient hardware faults, transient software faults, power failures, etc., can cause the software applications to produce incorrect results, crash, or otherwise fail to perform as designed. Oftentimes, to reduce the amounts of data and compute time lost in the event of such an error, the state of such a software application is stored at different points in time as "checkpoints." If the software application fails to perform as designed, then the state of the software application is rolled back to the most recent checkpoint and the software application is restarted from that checkpoint. Comprehensively checkpointing and restarting the software application involves checkpointing and restarting both a "process" that encapsulates the execution of the software application on the primary processor and a "context" that encapsulates the execution of the software application on the parallel processor. While existing techniques for checkpointing and restarting processes are typically efficient, existing techniques for checkpointing and restarting contexts suffer from a variety of inefficiencies.

In one approach to checkpointing and restarting contexts, functionality to maintain application data and memory allocation data is added to the API(s) in the programming platform driver stack to generate wrapper API(s). To enable comprehensive checkpoint and restart for the context of a software application, the software application is modified to make wrapper API calls, generate checkpoints for the context as desired, and restart the context as needed. To generate each checkpoint, the software application stores the application data and the memory allocation data acquired via the wrapper API calls in host memory. To restart a context, the software application makes wrapper API calls to generate a new context, allocates device memory as per the memory allocation data in the most recent checkpoint, and copies the stored application data in the most recent checkpoint from host memory to the reallocated device memory.

One drawback of the above API-level approach is that checkpointing and restarting a context requires adding checkpoint and restart functionality to the source code of the associated software application. Another drawback of this approach is that because the software application can only access the parallel processor as a black-box via wrapper API calls, the software application cannot interrupt the parallel processor to perform checkpoints and restarts while the parallel processor is executing a kernel. Accordingly, if a transient failure occurs while a kernel is executing, then the data and the compute time associated with the kernel execution are entirely lost and the kernel is restarted from the beginning. Yet another drawback of this approach is that the overhead associated with generating checkpoints and restarting a context can be prohibitive. In particular, because of the relatively large amount of checkpoint data that is usually transferred between the primary processor and the parallel processor, the bandwidth between the primary processor and the parallel processor can become a bottleneck when checkpointing and restarting contexts. As a result, the overall performance of the software application can be degraded.

Another approach to checkpointing and restarting contexts is to implement a checkpoint/restart application that executes under the control of the primary processor and generates, updates, and restores, as needed, a snapshot of the entire parallel processor memory hierarchy (including the device memory) via calls to API(s) in the programming platform driver stack. To generate an initial checkpoint for a given context, the checkpoint/restart application copies the entire parallel processor memory hierarchy to host memory. To generate each subsequent checkpoint, the checkpoint/restart application copies any incremental changes to the parallel processor memory hierarchy from the parallel processor memory hierarchy to the checkpoint stored in the host memory. To restart the context, the checkpoint/restart application restores the parallel processor memory hierarchy as per the most recently generated checkpoint.

Unlike the previously described API-based approach, the above snapshot-based approach does not involve modifying software applications themselves. However, similar to the previously described API-based approach, the checkpoint/restart application accesses the parallel processor as a black box via API calls. Consequently, the checkpoint/restart application cannot interrupt the parallel processor to perform checkpoints and restarts while the parallel processor is executing a kernel. And because the parallel processor memory hierarchy can store the state of multiple contexts associated with multiple software applications, each checkpoint for a given context can include a substantial amount of data that is irrelevant to that context. Accordingly, relative to the previously described API-based approach, a degradation in the overall performance of a given software application attributable to transferring checkpoint data between the primary processor and the parallel processor can be exacerbated.

As the foregoing illustrates, what is needed in the art are more effective techniques for checkpointing and restarting contexts associated with the execution of software applications on parallel processors.

SUMMARY

One embodiment of the present invention sets forth a computer-implemented method for checkpointing a context associated with an execution of a software application on a parallel processor. The method includes causing parallel processing elements included in the parallel processor to stop executing a set of instructions in accordance with the context before executing a next instruction included in the set on instructions; causing the parallel processor to collect first state data associated with the context; generating a checkpoint based on the first state data, where the checkpoint is stored in a memory associated with the parallel processor; and causing the parallel processing elements to resume executing the set of instructions at the next instruction in accordance with the context.

At least one technical advantage of the disclosed techniques relative to the prior art is that, with the disclosed techniques, kernels can be preempted to enable intra-kernel checkpoint and intra-kernel restart of contexts. Accordingly, the amounts of data and compute time lost when a transient fault occurs while a parallel processor is executing a kernel can be reduced relative to prior art techniques. Another advantage of the disclosed techniques relative to the prior art is that checkpoints are stored in memory associated with the parallel processor instead of memory associated with the primary processor. Consequently, a degradation in the overall performance of a software application attributable to transferring checkpoint data between a primary processor and a parallel processor that are associated with prior art approaches can be eliminated with the disclosed techniques. These technical advantages provide one or more technological improvements over prior art approaches.

BRIEF DESCRIPTION OF THE DRAWINGS

So that the manner in which the above-recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
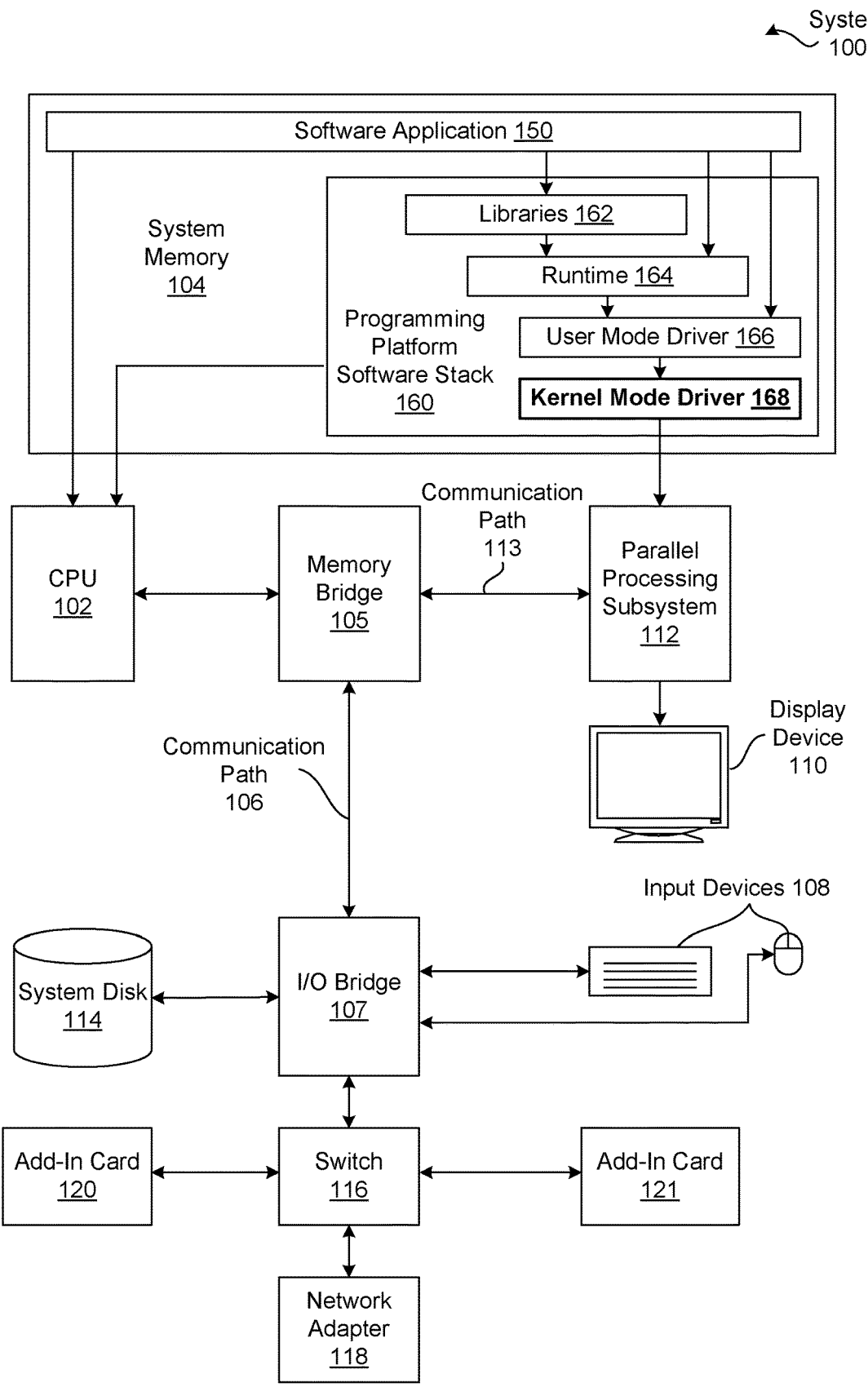
FIG. 1 is a block diagram illustrating a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As described previously herein, conventional approaches to checkpointing and restarting a context associated with an execution of a software application on a parallel processor typically involve accessing the parallel processor as a black box via API calls. Accessing the parallel processor as a black box via API calls precludes checkpointing and restarting contexts mid-kernel and can therefore increase the amounts of data and compute time lost when a transient fault occurs. Further, because a relatively large amount of checkpoint data is typically transferred between the primary processor and the parallel processor, the memory bandwidth between the primary processor and the parallel processor can become a bottleneck when checkpointing and restarting contexts. As a result, the overall performance of the software application can be degraded.

Leveraging Hardware Features to Checkpoint and Restart Contexts

To address these issues, in some embodiments, a software program executing on a primary processor more directly accesses a parallel processor to orchestrate checkpoints and restarts of contexts using hardware features of the parallel processor. In some embodiments, the software program is included in a programming platform driver stack and/or operates in a privileged mode with respect to the parallel processor. In operation, the software program leverages any number and/or types of hardware features of the parallel processor to interrupt and/or preempt a context, preserve context data, and resume execution of an interrupted context.

In some embodiments, the software program leverages hardware features of the parallel processor to interrupt kernels at instruction-level granularity. Advantageously, in such embodiments, the software program can checkpoint and restart contexts mid-kernel. In the same or other embodiments, the software program can store checkpoints in any number and/or types of memory associated with the parallel processor (e.g., device memory). Consequently, relative to prior art techniques, the bandwidth between the primary processor and the parallel processor is less likely to become a bottleneck when checkpointing and restarting contexts. Furthermore, relative to prior art techniques that access the parallel processor as a black box, the software program can more precisely determine and capture a minimal amount of context state required to properly restart an interrupted context.

As referred to herein, a "parallel processor" can be any computing system that includes, without limitation, multiple parallel processing elements that can be configured to perform any number and/or types of computations. And a "parallel processing element" of a computing system is a physical unit of simultaneous execution in the computing system. In some embodiments, the parallel processor can be a parallel processing unit ("PPU"), a graphics processing unit ("GPU"), a tensor processing unit, a multi-core central processing unit ("CPU"), or any other type of processor that can support parallel execution of multiple threads.

For explanatory purposes only, the optionally hierarchical subset of units included in a parallel processor that is capable of executing a kernel is referred to herein as a "compute engine." Each compute engine excludes any units of the associated parallel processor that are incapable of executing a kernel. For instance, the compute engine of a PPU or a GPU excludes units of the PPU or GPU that are specialized to perform graphics operations, such as texture units.

The primary processor can be any type of processor that is capable of launching kernels on the parallel processor. The term "kernel," as used herein, refers to a set of instructions (e.g., a program, a function, etc.) that can execute on a parallel processor. In some embodiments, the primary processor is a latency-optimized general-purpose processor, such as a central processing unit ("CPU").

In some embodiments, the software program can checkpoint and restart contexts associated with any number and/or types or parallel processors for any number and/or types of software applications that execute under the control of any number and/or types of processors. In such embodiments, the techniques described herein are modified accordingly.

In the same or other embodiments, multiple contexts can be associated with a single parallel processor, each of the multiple contexts is also associated with a different software application accelerated using the parallel processor, and the techniques described herein are modified accordingly. In the same or other embodiments, multiple contexts can be associated with one or more parallel processors and a single software application accelerated using the parallel processor(s), and the techniques described herein are modified accordingly.

In some embodiments, the hardware-based checkpoint and restart techniques described herein are implemented in conjunction with any number and/or types of other checkpoint and restart techniques for specialized processing pipelines implemented by the parallel processor. For instance, in some embodiments, a PPU or a GPU is capable of executing kernels launched by software applications and executing graphics processing operations via a graphics processing pipeline. In such embodiments, one or more software programs implement the hardware-based checkpoint and restart techniques described herein for contexts associated with the software applications in addition to any number and/or types of checkpoint and restart techniques for graphics contexts associated with the graphics processing pipeline.

In the same or other embodiments, the hardware-based checkpoint restart techniques described herein are implemented in at least one of multiple parallel processors that are interconnected and included in a multi-processor system, such as a datacenter or a supercomputer. Each parallel processor that implements the hardware-based checkpoint and restart techniques generates local checkpoints that can enable rapid restarts and recoveries from errors in the parallel processor that do not impact the other parallel processors in the multi-processor system. Containment of these types of localized errors and subsequent recoveries to the impacted parallel processor can enable less frequent global coordinated system-wide checkpoints. As a result, the availability of the multi-processor system can be increased.

For explanatory purposes only, FIGS. 1-4 depict some embodiments in which the primary processor is an exemplary CPU and the parallel processor is an exemplary PPU that includes, without limitation, one or more streaming multiprocessors ("SMs"). Each SM includes, without limitation, execution units or "processor cores" that are the parallel processing elements of the PPU. An exemplary kernel mode device driver is included in a programming platform software stack and operates in privileged mode with respect to the PPU.

As described in greater detail below in conjunction with FIGS. 1-4, a resource manager included in the kernel mode device driver orchestrates checkpoints and restarts of contexts using hardware features of the compute engine that are associated with context switching. In particular, the resource manager uses a compute instruction-level preemption ("CILP") hardware feature of the compute engine to pre-empt compute tasks (e.g., kernels) at instruction-level granularity. To avoid transferring checkpoint data between the parallel processor and the primary processor, the resource manager stores context states as checkpoints in device memory. In the context of FIGS. 1-4, the device memory is also referred to as "parallel processing memory."

Figure 2:
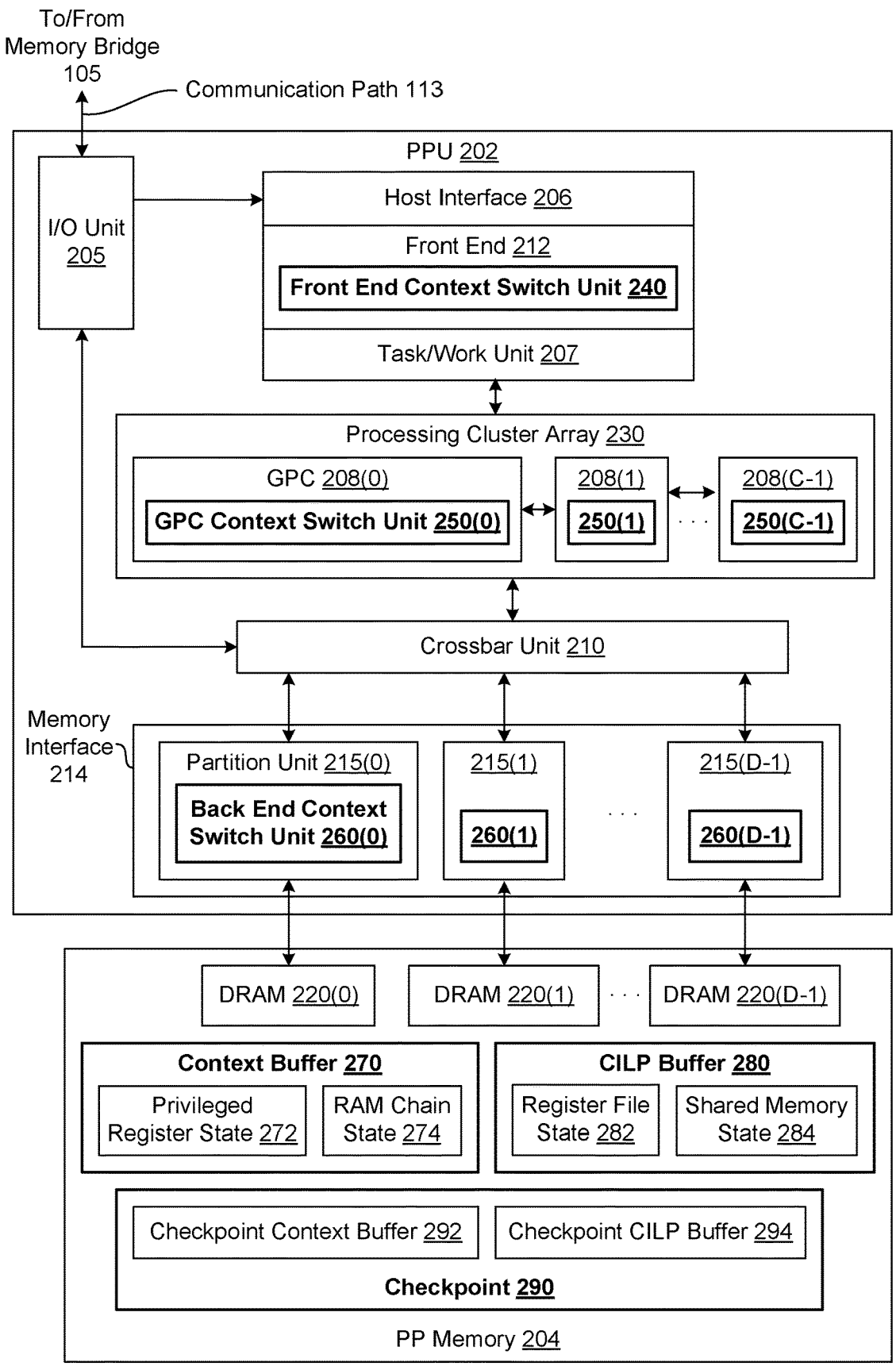
FIG. 2 is a block diagram of a parallel processing unit included in the parallel processing subsystem of FIG. 1, according to various embodiments.
Figure 3:
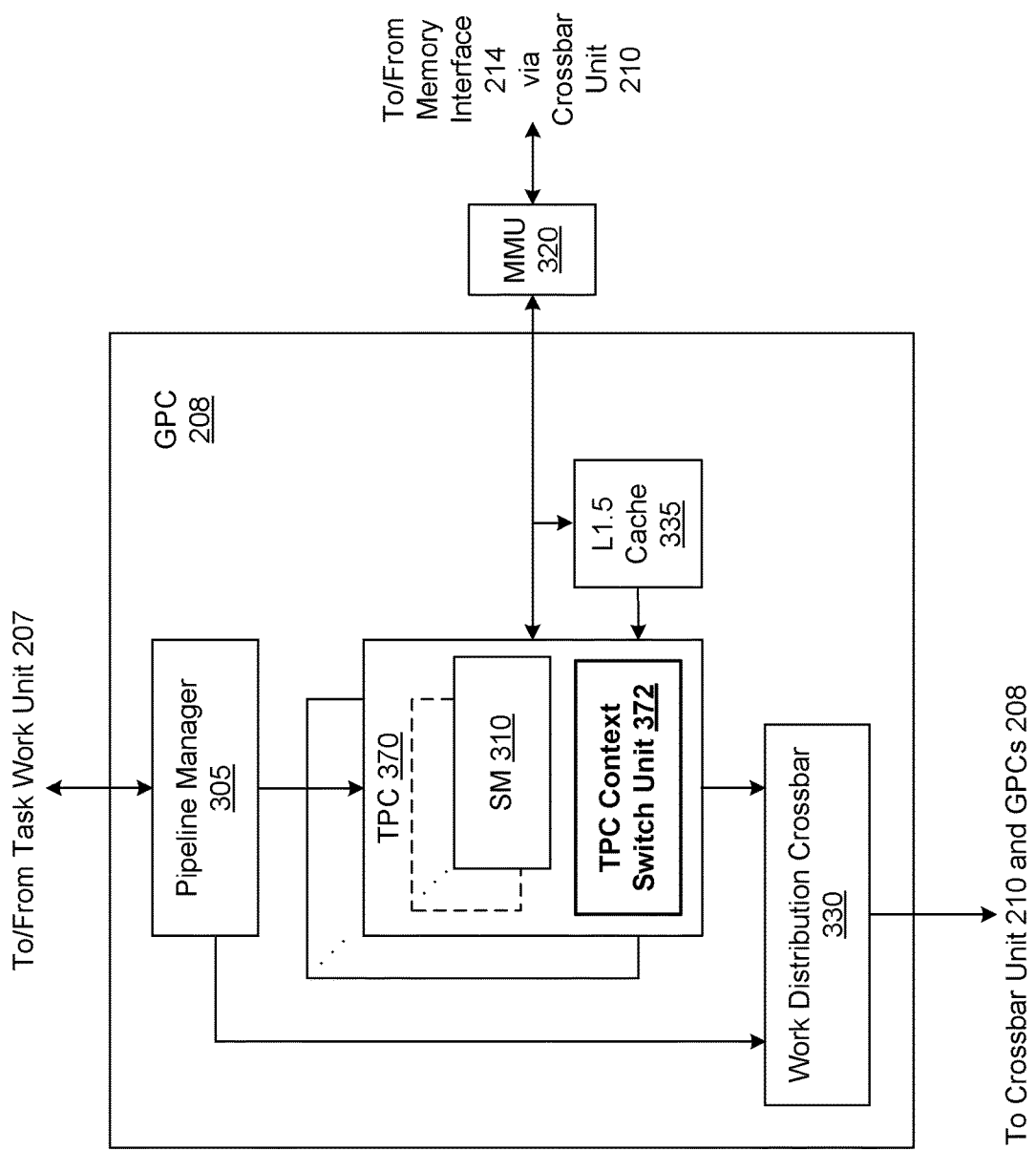
FIG. 3 is a block diagram of a general processing cluster included in the parallel processing unit of FIG. 2, according to various embodiments.
Figure 4:
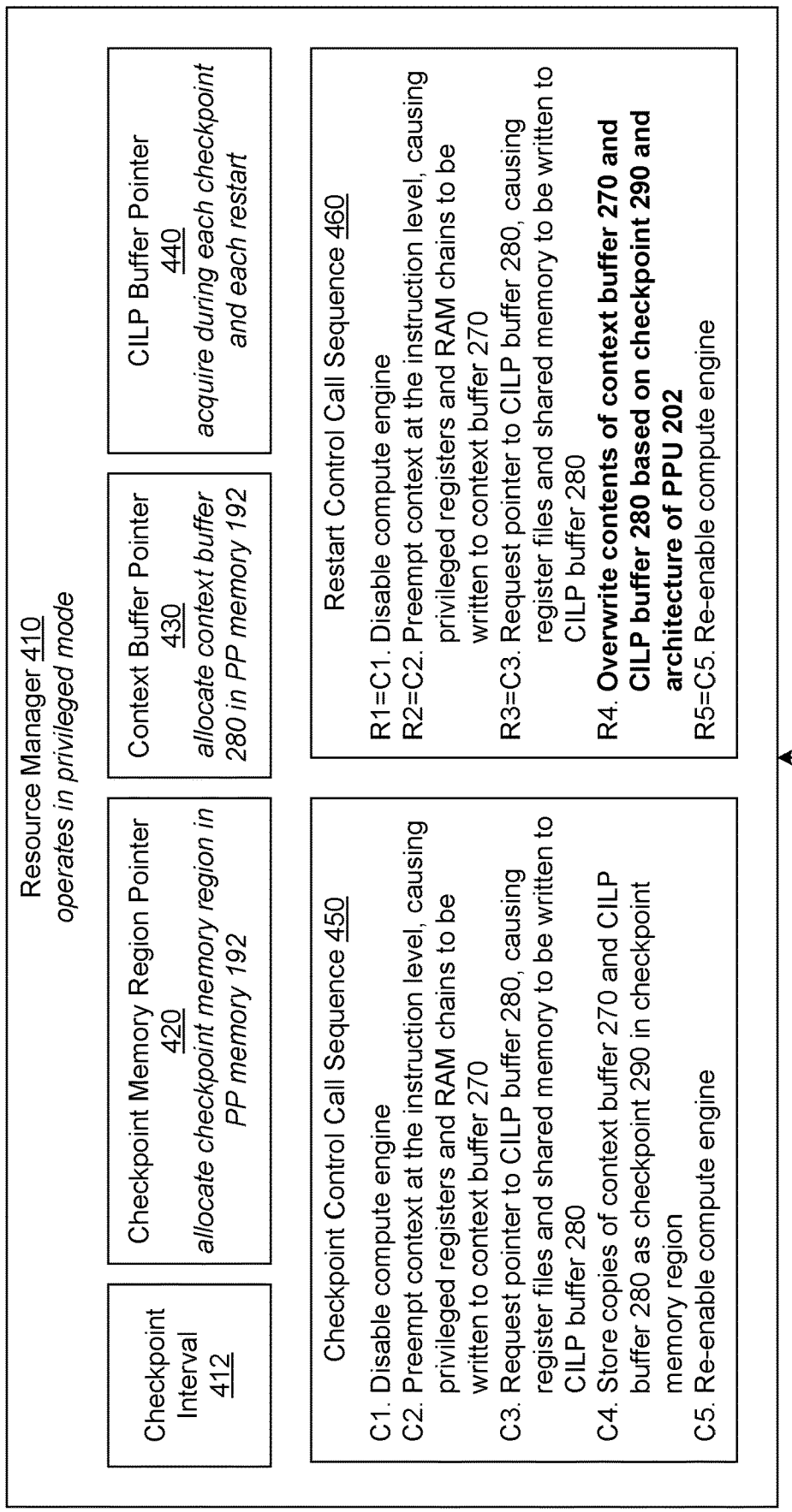
FIG. 4 is an example of a resource manager included in the kernel mode driver of FIG. 1, according to various embodiments.

After the detailed description of FIG. 4, the techniques described in FIGS. 1-4 are described in the context of some other embodiments in which any type of software program can checkpoint and restart contexts associated with an execution of any type of software application on any type of parallel processor. In a complementary fashion, a flow for checkpointing and restarting a context associated with an execution of a software application on a parallel processor is described in conjunction with FIG. 5.

Exemplary System Overview

FIG. 1 is a block diagram illustrating a system 100 configured to implement one or more aspects of the various embodiments. As shown, the system 100 includes, without limitation, a CPU 102 and a system memory 104 coupled to a parallel processing subsystem 112 via a memory bridge 105 and a communication path 113. In some embodiments, at least a portion of the system memory 104 is host memory associated with the CPU 102. The memory bridge 105 is further coupled to an input/output ("I/O") bridge 107 via a communication path 106, and the I/O bridge 107 is, in turn, coupled to a switch 116. For explanatory purposes only, multiple instances of like objects are denoted herein with reference numbers identifying the object and parenthetical alphanumeric character(s) identifying the instance where needed.

In operation, the I/O bridge 107 is configured to receive user input information from input devices 108, such as a keyboard or a mouse, and forward the input information to the CPU 102 for processing via the communication path 106 and the memory bridge 105. The switch 116 is configured to provide connections between the I/O bridge 107 and other components of the system 100, such as a network adapter 118 and add-in cards 120 and 121.

As also shown, the I/O bridge 107 is coupled to a system disk 114 that can be configured to store content, applications, and data for use by the CPU 102 and the parallel processing subsystem 112. As a general matter, the system disk 114 provides non-volatile storage for applications and data and can include fixed or removable hard disk drives, flash memory devices, compact disc read-only memory, digital versatile disc read-only memory, Blu-ray, high definition digital versatile disc, or other magnetic, optical, or solid-state storage devices. Finally, although not explicitly shown, other components, such as a universal serial bus or other port connections, compact disc drives, digital versatile disc drives, film recording devices, and the like, can be connected to the I/O bridge 107 as well.

In various embodiments, the memory bridge 105 can be a Northbridge chip, and the I/O bridge 107 can be a Southbridge chip. In addition, the communication paths 106 and 113, as well as other communication paths within the system 100, can be implemented using any technically suitable protocols, including, without limitation, Peripheral Component Interconnect Express, Accelerated Graphics Port, HyperTransport, or any other bus or point-to-point communication protocol known in the art.

In some embodiments, the parallel processing subsystem 112 includes, without limitation, one or more parallel processors. In some embodiments, each parallel processor is a PPU that includes, without limitation, one or more streaming multiprocessors ("SMs"). Each SM includes, without limitation, multiple execution units also referred to herein as "processor cores". In some embodiments, the PPUs can be identical or different, and each PPU can be associated with dedicated parallel processing ("PP") memory or no dedicated PP memory. In some embodiments, the PP memory associated with a given PPU is also referred to as the "device memory" associated with the PPU. In the same or other embodiments, each kernel that is launched on a given PPU resides in the device memory of the PPU.

In some embodiments, the parallel processing subsystem 112 incorporates circuitry optimized for general-purpose processing. As described in greater detail below in conjunction with FIG. 2, such circuitry can be incorporated across one or more PPUs that can be configured to perform general-purpose processing operations. In the same or other embodiments, the parallel processing subsystem 112 further incorporates circuitry optimized for graphics processing. Such circuitry can be incorporated across one or more PPUs that can be configured to perform graphics processing operations. In the same or other embodiments, any number of PPUs can output data to any number of display devices 110. In some embodiments, zero or more of the PPUs can be configured to perform general-purpose processing operations but not graphics processing operations, zero or more of the PPUs can be configured to perform graphics processing operations but not general-purpose processing operations, and zero or more of the PPUs can be configured to perform general-purpose processing operations and/or graphics processing operations.

In some embodiments, software applications executing under the control of the CPU 102 can launch kernels on one or more PPUs. As noted previously, for each PPU that is capable of executing a kernel, the hierarchical subset of units included in the PPU that are capable of executing the kernel is referred to herein as a "compute engine." Each compute engine excludes any units of the associated PPU that are specialized to perform graphics operations, such as texture units.

In some embodiments, the parallel processing subsystem 112 can be integrated with one or more other elements of FIG. 1 to form a single system. For example, the parallel processing subsystem 112 can be integrated with the CPU 102 and other connection circuitry on a single chip to form a system on a chip. In the same or other embodiments, any number of CPUs 102 and any number of parallel processing subsystems 112 can be distributed across any number of shared geographic locations and/or any number of different geographic locations and/or implemented in one or more cloud computing environments (i.e., encapsulated shared resources, software, data, etc.) in any combination.

The system memory 104 can include, without limitation, any number and/or types of system software (e.g., operating systems, device drivers, library programs, utility programs, etc.), any number and/or types of software applications, or any combination thereof. The system software and the software applications included in the system memory 104 can be organized in any technically feasible fashion.

As shown, in some embodiments, the system memory 104 includes, without limitation, a programming platform software stack 160 and a software application 150. The programming platform software stack 160 is associated with a programming platform for leveraging hardware in the parallel processing subsystem 112 to accelerate computational tasks. In some embodiments, the programming platform is accessible to software developers through, without limitation, libraries, compiler directives, and/or extensions to programming languages. In the same or other embodiments, the programming platform can be, but is not limited to, Compute Unified Device Architecture ("CUDA") (CUDA® is developed by NVIDIA Corporation of Santa Clara, CA), Radeon Open Compute Platform ("ROCm"), OpenCL (OpenCL™ is developed by Khronos group), SYCL, or Intel One API.

In some embodiments, the programming platform software stack 160 provides an execution environment for the software application 150 and zero or more other software applications (not shown). In the same or other embodiments, the software application 150 can include, without limitation, any computer software capable of being launched on the programming platform software stack 160. In some embodiments, the software application 150 can be, but is not limited to, an artificial intelligence application, a machine learning application, a high-performance computing application, a virtual desktop infrastructure, or a data center workload.

In some embodiments, the software application 150 and the programming platform software stack 160 execute under the control of the CPU 102. In the same or other embodiments, the software application 150 can access one or more PPUs included in the parallel processing subsystem 112 via the programming platform software stack 160. As shown, in some embodiments, the programming platform software stack 160 includes, without limitation, zero or more libraries 162, a runtime 164, a user mode driver 166, and a kernel mode driver 168.

In some embodiments, the libraries 162 include, without limitation, functions for performing mathematical, deep learning, and/or other types of operations that are optimized for execution on one or more of the compute engines. Although not shown, in some embodiments, the libraries 162 are associated with one or more APIs that expose functions implemented in the libraries 162. In the same or other embodiments, the runtime 164 includes, without limitation, any technically feasible runtime system that can support execution of the software application 150 and zero or more other software applications. Although not shown, in some embodiments, the runtime 164 is implemented as one or more libraries associated with one or more runtime APIs. In the same or other embodiments, the user mode driver 166 is implemented as a user mode library (not shown) that is associated with a user mode driver API (not shown).

In some embodiments, any number of the runtime APIs and the user mode driver API can expose, without limitation, any number of functions for each of memory management, execution control, device management, error handling, and synchronization, and the like. The memory management functions can include, but are not limited to, functions to allocate, deallocate, and copy device memory, as well as transfer data between host memory and device memory. The execution control functions can include, but are not limited to, functions to launch kernels on the compute engines. In some embodiments, relative to the runtime APIs, the user mode driver API is a lower-level API that provides more fine-grained control of the PPUs. In the same or other embodiments, the user mode driver API exposes functions for context management that are not exposed by the runtime APIs.

In some embodiments, the kernel mode driver 168 operates in a privileged mode with respect to the PPU(s) and facilitates communication with the PPU(s). As described previously herein, in some embodiments the kernel mode driver 168 includes, without limitation, a resource manager (not shown in FIG. 1). In some embodiments, the resource manager operates in a privileged mode with respect to PPU(s) and orchestrates checkpoints and restarts of contexts using hardware features of the PPU(s) that are associated with context switching. Some of the hardware features of the PPU(s) that the resource manager can use to orchestrate checkpoints and restarts of contexts are described in greater detail below in conjunction with FIGS. 2 and 3. An exemplary resource manager is described in greater detail below in conjunction with FIG. 4.

Note that the techniques described herein are illustrative rather than restrictive and may be altered without departing from the broader spirit and scope of the invention. Many modifications and variations on the functionality provided by the software application 150, the programming platform software stack 160 the libraries 162, the runtime 164, the user mode driver 166, the kernel mode driver 168, the CPU 102, the parallel processing subsystem 112, the PPU(s), the SM(s), the compute engine(s), and the resource manager will be apparent to those of ordinary skill in the art without departing from the scope and spirit of the described embodiments.

It will be appreciated that the system shown herein is illustrative and that variations and modifications are possible. The connection topology, including the number and arrangement of bridges, the number of the CPUs 102, and the number of the parallel processing subsystems 112, can be modified as desired. For example, in some embodiments, the system memory 104 can be connected to the CPU 102 directly rather than through the memory bridge 105, and other devices can communicate with the system memory 104 via the memory bridge 105 and the CPU 102. In some other alternative topologies, the parallel processing subsystem 112 can be connected to the I/O bridge 107 or directly to the CPU 102, rather than to the memory bridge 105. In still other embodiments, the I/O bridge 107 and the memory bridge 105 can be integrated into a single chip instead of existing as one or more discrete devices. Lastly, in certain embodiments, one or more components shown in FIG. 1 may not be present. For example, the switch 116 could be eliminated, and the network adapter 118 and the add-in cards 120, 121 would connect directly to the I/O bridge 107.

FIG. 2 is a block diagram of a PPU 202 included in the parallel processing subsystem 112 of FIG. 1, according to various embodiments. Although FIG. 2 depicts one PPU 202, as indicated above, the parallel processing subsystem 112 can include zero or more other PPUs that are identical to the PPUs 202 and zero or more other PPUs that are different from the PPU 202. As shown, the PPU 202 is coupled to a local parallel processing ("PP") memory 204. The PPU 202 and the PP memory 204 can be implemented using one or more integrated circuit devices, such as programmable processors, application specific integrated circuits, or memory devices, or in any other technically feasible fashion.

As shown, the PPU 202 incorporates circuitry optimized for general-purpose processing, and the PPU 202 can be configured to perform general-purpose processing operations. In some embodiments, software applications including, without limitation, the software application 150 of FIG. 1, can program the PPU 202 via the programming platform software stack 160 of FIG. 1.

Although not shown in FIG. 2, in some embodiments, the PPU 202 further incorporates circuitry optimized for graphics processing, including, for example, video output circuitry. In such embodiments, the PPU 202 can be configured to perform general-purpose processing operations and/or graphics processing operations.

Referring again to FIG. 1 as well as FIG. 2, in some embodiments, the CPU 102 is the master processor of the system 100, controlling and coordinating operations of other system components. In particular, the CPU 102 issues commands that control the operation of the PPU 202. In some embodiments, the CPU 102 writes a stream of commands for the PPU 202 to a data structure (not explicitly shown in either FIG. 1 or FIG. 2) that can be located in the system memory 104, the PP memory 204, or another storage location accessible to both the CPU 102 and the PPU 202. A pointer to the data structure is written to a pushbuffer to initiate processing of the stream of commands in the data structure. The PPU 202 reads command streams from the pushbuffer and then executes commands asynchronously relative to the operation of the CPU 102. In embodiments where multiple pushbuffers are generated, execution priorities can be specified for each pushbuffer by an application program via a device driver (not shown) to control scheduling of the different pushbuffers.

Referring back now to FIG. 2 as well as FIG. 1, in some embodiments, the PPU 202 includes an I/O unit 205 that communicates with the rest of system 100 via the communication path 113, which connects to memory bridge 105. In some other embodiments, the I/O unit 205 communicates with the rest of system 100 via the communication path 113, which connects directly to CPU 102. In the same or other embodiments, the connection of the PPU 202 to the rest of the system 100 can be varied. In some embodiments, the parallel processing subsystem 112, which includes at least one PPU 202, is implemented as an add-in card that can be inserted into an expansion slot of the system 100. In some other embodiments, the PPU 202 can be integrated on a single chip with a bus bridge, such as the memory bridge 105 or the I/O bridge 107. In some other embodiments, some or all of the elements of the PPU 202 can be included along with the CPU 102 in a single integrated circuit or system on a chip.

The I/O unit 205 generates packets (or other signals) for transmission on the communication path 113 and also receives all incoming packets (or other signals) from the communication path 113, directing the incoming packets to appropriate components of the PPU 202. For example, commands related to processing tasks can be directed to a host interface 206, while commands related to memory operations (e.g., reading from or writing to the PP memory 204) can be directed to a crossbar unit 210. The host interface 206 reads each pushbuffer and transmits the command stream stored in the pushbuffer to a front end 212.

In operation, the front end 212 transmits processing tasks received from the host interface 206 to a work distribution unit (not shown) within a task/work unit 207. The work distribution unit receives pointers to processing tasks that are encoded as task metadata ("TMD") and stored in memory. The pointers to TMDs are included in a command stream that is stored as a pushbuffer and received by the front end 212 from the host interface 206. Processing tasks that can be encoded as TMDs include indices associated with the data to be processed as well as state parameters and commands that define how the data is to be processed. For example, the state parameters and commands could define the program to be executed on the data.

The PPU 202 advantageously implements a highly parallel processing architecture based on a processing cluster array 230 that includes a set of C general processing clusters ("GPCs") 208, where C≥1. Each of the GPCs 208 is capable of executing a large number (e.g., hundreds or thousands) of threads concurrently, where each thread is an instance of a program (e.g., a kernel). In various applications, different GPCs 208 can be allocated for processing different types of programs or for performing different types of computations. The allocation of the GPCs 208 can vary depending on the workload arising for each type of program or computation. The GPCs 208 receive processing tasks to be executed from the work distribution unit within the task/work unit 207.

The task/work unit 207 receives processing tasks from the front end 212 and ensures that GPCs 208 are configured to a valid state before the processing task specified by each one of the TMDs is initiated. A priority can be specified for each TMD that is used to schedule the execution of the processing task. Processing tasks also can be received from the processing cluster array 230. Optionally, the TMD can include a parameter that controls whether the TMD is added to the head or the tail of a list of processing tasks (or to a list of pointers to the processing tasks), thereby providing another level of control over execution priority.

Memory interface 214 includes a set of D partition units 215, where D≥1. Each of the partition units 215 is coupled to one or more dynamic random access memories ("DRAMs") 220 residing within the PP memory 204. In some embodiments, the number of the partition units 215 equals the number of the DRAMs 220, and each of the partition units 215 is coupled to a different one of the DRAMs 220. In some other embodiments, the number of the partition units 215 can be different than the number of the DRAMs 220. Persons of ordinary skill in the art will appreciate that the DRAM 220 can be replaced with any other technically suitable storage device. In operation, various targets can be stored across the DRAMs 220, allowing the partition units 215 to write portions of each target in parallel to efficiently use the available bandwidth of the PP memory 204.

A given GPC 208 can process data to be written to any of the DRAMs 220 within the PP memory 204. The crossbar unit 210 is configured to route the output of each GPC 208 to the input of any partition unit 215 or to any other GPC 208 for further processing. The GPCs 208 communicate with the memory interface 214 via the crossbar unit 210 to read from or write to any number of the DRAMs 220. In some embodiments, the crossbar unit 210 has a connection to the I/O unit 205 in addition to a connection to the PP memory 204 via the memory interface 214, thereby enabling the SMs within the different GPCs 208 to communicate with the system memory 104 or other memory not local to the PPU 202. In the embodiment of FIG. 2, the crossbar unit 210 is directly connected with the I/O unit 205. In various embodiments, the crossbar unit 210 can use virtual channels to separate traffic streams between the GPCs 208 and the partition units 215.

Again, the GPCs 208 can be programmed to execute processing tasks relating to a wide variety of applications and/or algorithms. In some embodiments, the PPU 202 is configured to transfer data from the system memory 104 and/or the PP memory 204 to one or more on-chip memory units, process the data, and write result data back to the system memory 104 and/or the PP memory 204. The result data can then be accessed by other system components, including the CPU 102, another PPU 202 within the parallel processing subsystem 112, or another parallel processing subsystem 112 within the system 100.

As noted above, any number of the PPUs 202 can be included in the parallel processing subsystem 112. For example, multiple PPUs 202 can be provided on a single add-in card, or multiple add-in cards can be connected to the communication path 113, or one or more of the PPUs 202 can be integrated into a bridge chip. The PPUs 202 in a multi-PPU system can be identical to or different from one another. For example, different PPUs 202 might have different numbers of processor cores and/or different amounts of the PP memory 204. In implementations where multiple PPUs 202 are present, those PPUs 202 can be operated in parallel to process data at a higher throughput than is possible with a single PPU 202. Systems incorporating one or more PPUs 202 can be implemented in a variety of configurations and form factors, including, without limitation, desktops, laptops, handheld personal computers or other handheld devices, servers, workstations, game consoles, embedded systems, and the like.

As outlined previously herein in conjunction with FIG. 1, in some embodiments, the resource manager orchestrates checkpoints and restarts contexts using hardware features of the PPU 202. The resource manager can access any number and/or types of hardware features of the PPU 202 in any technically feasible fashion. For instance, in some embodiments, the resource manager is included in the kernel mode driver 168, and the resource manager accesses the PPU 202 and the PP memory 204 in the same fashion as the kernel mode driver 168. The kernel mode driver 168 and the resource manager can access the PPU 202 and the PP memory 204 in any technically feasible fashion.

In some embodiments, the kernel mode driver 168 and the resource manager execute on the CPU 102 and access the PPU 202 and the PP memory 204 via the CPU 102. In particular, in some embodiments, the resource manager issues commands that control the operation of the PPU 202 via the CPU 102. As described previously herein, in some embodiments, the I/O unit 205 directs commands related to processing tasks to the host interface 206 and commands related to memory operations (e.g., reading from or writing to the PP memory 204) to the crossbar unit 210. In some embodiments, to enable efficient checkpoints and restarts, the resource manager operates in a privileged mode with respect to the PPU 202

As described in greater detail below in conjunction with FIG. 4, in some embodiments, the resource manager executes a sequence of commands or "control calls" to generate a checkpoint 290 for a context. The sequence of control calls to checkpoint a context is also referred to herein as referred to as a "checkpoint control call sequence." As shown, in some embodiments, the checkpoint 290 is stored in PP memory 204. In some embodiments, the resource manager repeatedly executes the checkpoint control call sequence to generate the checkpoint 290 and any number of other checkpoints, where each checkpoint is associated with the context and a different point in time.

As shown, in some embodiments, the checkpoint 290 includes, without limitation, a checkpoint context buffer 292 and a checkpoint CILP buffer 294. In the same or other embodiments, the checkpoint context buffer 292 and the checkpoint CILP buffer 294 are copies of a context buffer 270 and a CILP buffer 280, respectively. As described in greater detail below, in some embodiments, the checkpoint control call sequence causes the PPU 202 to write a core context switch state to the context buffer 270 and an SM context state to the CILP buffer 280. The core context switch state and the SM context state are also referred to herein collectively as a "context state," and the context buffer 270 and the CILP buffer 280 are also referred to herein individually as "context state buffer" and collectively as "context state buffers."

In some embodiments, the context buffer 270 and the CILP buffer 280 are stored in the PP memory 204. The resource manager can acquire pointers to the context buffer 270 and the CILP buffer 280 in any technically feasible fashion. In some embodiments, the location of the context buffer 270 can change. In the same or other embodiments, prior to capturing each checkpoint 290, the resource manager issues a query to determine the location of the context buffer 270 and uses the associated pointer value to copy the contents of the context buffer 270. In some embodiments, after the resource manager acquires a pointer to the context buffer 270, the location of the context buffer 270 does not change. In the same or other embodiments, the resource manager allocates the context buffer 270 as part of an initialization process. In some embodiments, because the location of the CILP buffer 280 can change, the resource manager acquires an up-to-date pointer to the CILP buffer 280 during each checkpoint and restart.

In some embodiments, to generate the checkpoint 290, the resource manager copies the context buffer 270 and a CILP buffer 280 to a region of the PP memory 204 that is allocated for storing checkpoints. A region of the PP memory 204 can be allocated for storing checkpoints in any technically feasible fashion. For instance, in some embodiments, the resource manager allocates the region of the PP memory 204 that is to be used to store checkpoints as part of an initialization process. In some embodiments, the resource manager may copy any number of checkpoints from the PP memory 204 to the system memory 104 and/or to any type of local persistent storage.

As shown, in some embodiments, the context buffer 270 includes, without limitation, a privileged register state 272 and a random-access memory ("RAM") chain state 274. The privileged register state 272 includes, without limitation, the states of privileged registers (not shown) included in the PPU 202. In some embodiments, the privileged resisters included in the PPU 202 are accessible via software to control the operation of specific units of the PPU 202 and the PPU 202 as a whole. Among other things, in some embodiments, privileged registers can affect operating modes of any number and/or types of units, contain debug information, and contain global parameters for power and clock gating control. In some embodiments, the RAM chain state 274 includes, without limitation, the states of any number of RAM chains (not shown) included in the PPU 202. In some embodiments, each RAM chain includes, without limitation, one or more flip-flops and zero or more intermediary buffers that are used as first-in, first-out buffers and/or queues. In some embodiments, each RAM chain is associated with a different unit of the PPU 202 and includes, without limitation, the states of the flip-flops included in the unit.

The PPU 202 can capture and store the core context switch state in the context buffer 270 in any technically feasible fashion. For instance, in some embodiments, the host interface 206 causes a front end context switch unit 240, GPC context switch units 250(0)-250(C-1), any number of thread processing cluster ("TPC") context switch units (not shown in FIG. 2), and back end context switch units 260(0)-260(D-1) to store the core context switch state in the context buffer 270.

As shown, in some embodiments, the front end context switch unit 240 is included in the front end 212. The front end context switch unit 240 is a central context switch controller that communicates with the host interface 206 to process context switch and execution preemption requests. In some embodiments, the front end context switch unit 240 includes, without limitation, a microcontroller that serves as a privileged register and RAM chain master. The microcontroller in the front end context switch unit 240 saves and restores the state of all of the units in the PPU pipeline during checkpoint and restart, respectively.

The microcontroller in the front end context switch unit 240 can save and restore the state of all of the units in the PPU pipeline based on any type of trigger and in any technically feasible fashion. For instance, in some embodiments, as part of each context switch sequence, the host interface 206 raises an interrupt to the microcontroller in the front end context switch unit 240. In response, the microcontroller in the front end context switch unit 240 manages the collection of the core context switch state into the context buffer 270 in any technically feasible fashion.

The GPC context switch units 250(0)-250(C-1) are included in the GPCs 208(0)-208(C-1), respectively. The GPC context switch units 250 are context switch controllers for the GPCs 208(0)-208(C-1), respectively. In some embodiments, each of the GPC context switch units 250 includes, without limitation, a microcontroller or a controller that can run microcode received from the host interface 206. As described in greater detail below in conjunction with FIG. 4, in some embodiments, each GPC 208 includes, without limitation, one or more thread processing clusters ("TPCs"). Each TPC includes, without limitation, a different TPC context switch unit that drives privileged register infrastructure and RAM chains for the TPC. In some embodiments, the TPC context switch units are driven by the microcontroller in the front end context switch unit 240 through the privileged registers. The back end context switch units 260(0)-260(D-1) are included in the partition units 215(0)-215(D-1), respectively. In some embodiments, the back end context switch units 260(0)-260(D-1) drive privileged register infrastructures and RAM chains for the partitions 215(0)-215(D-1), respectively.

As shown, in some embodiments, the CILP buffer 280 includes, without limitation, a register file state 282 and a shared memory state 284. Although not shown, in some embodiments, the CILP buffer 280 further includes, without limitation, any amount and/or types of additional data. For instance, in some embodiments, the CILP buffer 280 includes, without limitation, the register file state 282, the shared memory state 284, and data specifying pending thread warps to be scheduled, thread barriers, thread block metadata, and the like. The CILP buffer 280 reserves space to store the complete PPU register file and any number and/or types of shared memories associated with the SMs. The resource manager can cause the PPU 202 to capture and store the SM state in the CILP buffer 280 and provide an up-to-date pointer to the CILP buffer 280 in any technically feasible fashion.

For instance, in some embodiments, as part of the checkpoint control call sequence, the resource manager makes a control call to retrieve a pointer to the CILP buffer 280. In response, a trap handler routine executing on each SM writes the register files and the shared memory associated with the SM to the CILP buffer 280. After the trap handler routine stores the per-thread register state and shared memory state in the CILP buffer 280, the host interface 206 provides the resource manager with a pointer to the CILP buffer 280.

As described in greater detail below in conjunction with FIG. 4, in some embodiments, the resource manager executes a sequence of control calls referred to herein as a "restart control call sequence" to restart a context from a previous checkpoint (e.g., the checkpoint 290). As part of each restart control call sequence, the resource manager retrieves a pointer to the CILP buffer 280 and then overwrites the contents of both the context buffer 270 and the CILP buffer 280 based on a previously-stored checkpoint (e.g., the checkpoint 190). The resource manager can overwrite the contents of the context buffer 270 and the CILP buffer 280 in any technically feasible fashion.

For instance, in some embodiments, the offsets of individual register and RAM locations within the context buffer 270 and the CILP buffer 280 are defined by the architecture of the PPU 202. Based on the architecture of the PPU 202, the pointer to the context buffer 270, and the pointer to the CILP buffer 280, the resource manager overwrites the contents of the context buffer 270 and the CILP buffer 280 with the contents of the checkpoint context buffer 292 and the checkpoint CILP buffer 294, respectively. Notably, in some embodiments, the CILP buffer 280 is privileged, and the resource manager is able to overwrite the CILP buffer 280 because the resource manager operates in a privileged mode with respect to the PPU 202.

Note that the techniques described herein are illustrative rather than restrictive and may be altered without departing from the broader spirit and scope of the invention. Many modifications and variations on the functionality provided by the resource manager, the kernel mode driver 168, the PPUs 202, the SMs 310, the host interface 206 the front end context switch unit 240, the GPC context switch units 250(0)-250(C-1), the TPC context switch units, and the back end context switch units 260(0)-260(D-1) will be apparent to those of ordinary skill in the art without departing from the scope and spirit of the described embodiments.

FIG. 3 is a block diagram of a GPC 208 included in the PPU 202 of FIG. 2, according to various embodiments. In operation, the GPC 208 can be configured to execute a large number of threads in parallel. In some embodiments, each thread executing on the GPC 208 is an instance of a particular program executing on a particular set of input data. In some embodiments, single-instruction, multiple-data ("SIMD") instruction issue techniques are used to support parallel execution of a large number of threads without providing multiple independent instruction units. In some other embodiments, single-instruction, multiple-thread ("SIMT") techniques are used to support parallel execution of a large number of generally synchronized threads, using a common instruction unit configured to issue instructions to a set of processing engines within the GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of the GPC 208 is controlled via a pipeline manager 305 that distributes processing tasks received from the work distribution unit (not shown) within the task/work unit 207 to one or more SMs 310. The pipeline manager 305 can also be configured to control a work distribution crossbar 330 by specifying destinations for processed data output by the SMs 310.

In some embodiments the GPC 208 includes, without limitation, a number T of TPCs 370, where T≥1. As shown, each of the TPCs 370 includes, without limitation a TPC context switch unit 372 and a number M of SMs 310, where M≥1. As described previously herein in conjunction with FIG. 3, for each TPC 390, the TPC context switch unit 372 drives a privileged register infrastructure (not shown) and RAM chains (not shown) for the TPC 390. In some embodiments, the TPC context switch units are driven by the microcontroller in the front end context switch unit 240 through the privileged registers.

In some embodiments, each SM 310 includes, without limitation, a set of functional units. In some embodiments, each set of functional units includes, without limitation, any number of execution units and any number of load-store units. Processing operations specific to any of the functional units can be pipelined, which enables a new instruction to be issued for execution before a previous instruction has completed execution. Any combination of functional units within a given SM 310 can be provided. In various embodiments, the functional units can be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional unit can be configured to perform different operations.

In some embodiments, each SM 310 is configured to concurrently process one or more cooperative thread arrays ("CTAs"). Each CTA is also referred to herein as a "thread group" and a "thread block." Each CTA can be a single thread, a single-dimensional array of threads, or a multi-dimensional block of threads that is configured to concurrently execute the same program on different input data. Each CTA that is configured to concurrently execute a given kernel on different input data is also referred to herein as "a thread group instance" of the kernel. In some embodiments, each SM 310 can concurrently process a maximum number of CTAs (e.g., one, two, etc.) that is dependent on the size of the CTAs.

In some embodiments, each thread in each CTA is assigned a unique thread identifier ("ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write. In some embodiments, the threads in each CTA can synchronize together, collaborate, communicate, or any combination thereof in any technically feasible fashion. For instance, in some embodiments, the threads in each CTA can synchronize together, collaborate, communicate, or any combination thereof via shared memory.

In some embodiments, each SM 310 includes, without limitation, a shared memory that is allocated per CTA. For each CTA, each of the threads in the CTA has access to the portion of the shared memory that is allocated to the CTA. The shared memory can be implemented in any technically feasible fashion. For instance, in some embodiments, the shared memory is a shared register file or a shared on-chip cache memory with an interconnect that enables each of execution units in the SM 310 to read to and write from any location in the shared memory.

In some embodiments, thread blocks that are configured to execute the same kernel are organized into a single dimensional or multi-dimensional grid. In the same or other embodiments, each CTA is assigned a unique CTA ID that is accessible to each thread in the CTA during the thread's execution. The configurations (e.g., size, dimensions, etc.)

of grids and CTAs can be determined in any technically feasible fashion. For instance, in some embodiments, the configuration of each grid and the configuration of the CTAs in the grid is determined by the programmer and the amounts of hardware resources, such as memory or registers, available to the grid and the CTAs.

In some embodiments, each CTA can include fewer threads than the number of execution units within the SM 310 that the CTA is scheduled onto, in which case some of the execution units can be idle during cycles when that CTA is being processed. In the same or other embodiments, each CTA can include more threads than the number of execution units within the SM 310 that the CTA is scheduled onto, in which case processing can occur over consecutive clock cycles.

In some embodiments, each of the SMs 310 contains a level one ("L1") cache (not shown in FIG. 3) or uses space in a corresponding L1 cache outside of the SM 310 to support, among other things, load and store operations. Each of the SMs 310 also has access to level two ("L2") caches (not shown) that are shared among all the GPCs 208 in the PPU 202. In some embodiments, the L2 caches can be used to transfer data between threads. In the same or other embodiments, the SMs 310 have access to off-chip "global" memory, which can include the PP memory 204 and/or the system memory 104. It is to be understood that any memory external to the PPU 202 can be used as global memory.

In some embodiments, as shown in FIG. 3, a level one-point-five ("L1.5") cache 335 can be included within the GPC 208 and configured to receive and hold data requested from memory via the memory interface 214 by the SM 310 and provide the requested data to the SM 310. Such data can include, without limitation, instructions, uniform data, and constant data. In embodiments having multiple SMs 310 within the GPC 208, the SMs 310 can beneficially share common instructions and data cached in the L1.5 cache 335.

Each GPC 208 can have an associated memory management unit ("MMU") 320 that is configured to map virtual addresses into physical addresses. In various embodiments, the MMU 320 can reside either within the GPC 208 or within the memory interface 214. The MMU 320 includes a set of page table entries used to map a virtual address to a physical address of a tile or memory page and optionally a cache line index. The MMU 320 can include address translation lookaside buffers or caches that can reside within the SMs 310, within one or more L1 caches, or within the GPC 208.

In some embodiments, each SMs 310 transmits a processed task to the work distribution crossbar 330 in order to provide the processed task to another GPC 208 for further processing or to store the processed task in an L2 cache (not shown), the PP memory 204, or the system memory 104 via the crossbar unit 210.

It will be appreciated that the core architecture described herein is illustrative and that variations and modifications are possible. Among other things, any number and/or types of processing units, such as the SMs 310, can be included within the GPC 208. Further, as described above in conjunction with FIG. 2, the PPU 202 can include any number of the GPCs 208 that are configured to be functionally similar to one another so that execution behavior does not depend on which of the GPCs 208 receives a particular processing task. Further, in some embodiments, each of the GPCs 208 operates independently of the other GPCs 208 in the PPU 202 to execute tasks for one or more application programs. In view of the foregoing, persons of ordinary skill in the art will appreciate that the architecture described in FIGS. 1-3 in no way limits the scope of the present disclosure.

Exemplary Checkpoint and Restart Control Call Sequences

FIG. 4 is an example of a resource manager 410 that is included in the kernel mode driver 168 of FIG. 1, according to various embodiments. As shown, in some embodiments, the resource manager 410 operates in privileged mode with respect to the PPU 202 and interfaces with the PPU 202 via the host interface 206. In particular, the resource manager 410 accesses hardware features of the PPU 202 via the host interface 206.

As shown, in some embodiments, the resource manager 410 includes, without limitation, a checkpoint interval 412, a checkpoint memory region pointer 420, a context buffer pointer 430, a CILP buffer pointer 440, a checkpoint control call sequence 450, and a restart control call sequence 460. In some embodiments, the checkpoint interval 412 specifies an interval within each kernel that the software application 150 launches on the PPU 202 at which the resource manager 410 checkpoints the associated context. In such embodiments, during a relatively short-running kernel, the resource manager 410 may not checkpoint the associated context. By contrast, during a relatively long-running kernel, the resource manager may checkpoint the associated context multiple times.

In some other embodiments, the user mode driver 166 enables tagging of kernels to indicate which of the kernels are to have intra-kernel checkpoint and restart capability. If a kernel is tagged, then the resource manager 410 checkpoints the kernel as per the checkpoint interval 412. If, however, a kernel is not tagged, then the resource manager 410 does not perform checkpointing (and therefore does not enable restarting) while the kernel is running. In yet other embodiments, the resource manager 410 can execute checkpoints based on any number and/or types of technically feasible checkpoint triggers.

In a complementary fashion, the resource manager 410 can execute restarts based on any number and/or types of technically feasible restart triggers. For instance, in some embodiments, the resource manager 410 or the PPU 202 leverages any number and/or types of hardware mechanisms to detect data corruption in the states of contexts. In the same or other embodiments, the resource manager 410 or the PPU 202 detects any type of fault that could impact any number of contexts in any technically feasible fashion. If data corruption in a state of a context or a fault that impacts a context is detected, then the resource manager 410 restarts the context from a previously-stored checkpoint. The resource manager 410 can determine the checkpoint used to restart the context in any technically feasible fashion. In some embodiments, the resource manager 410 restarts the context based on a specified checkpoint. In some other embodiments, the resource manager 410 selects the most recent of the checkpoints for the context that were generated before the corruption or fault was detected.

In some embodiments, the checkpoint memory region pointer 420 is a pointer to a region in the PP memory 204 that is allocated for the storage of checkpoint(s). The resource manager 410 can acquire the checkpoint memory region pointer 420 in any technically feasible fashion. For instance, in some embodiments, the resource manager 410 allocates the region of the PP memory 204 that is to be used to store checkpoints as part of an initialization process.

In the same or other embodiments, the context buffer pointer 430 is a pointer to the context buffer 270. The resource manager 410 can acquire the context buffer pointer 430 in any technically feasible fashion. For instance, in some embodiments, the resource manager 410 allocates the context buffer 270 in the PP memory 204.

The CILP buffer pointer 440 is a pointer to the CILP buffer 280. In some embodiments, the CILP buffer 280 can change location. Accordingly, in some such embodiments, the resource manager 410 acquires the CILP buffer pointer 440 during each checkpoint and each restart. In some other embodiments, the resource manager 410 can acquire, in any technically feasible fashion, any number of pointers to any number and/or types of context state buffers instead of or in addition to the context buffer pointer 430 and/or the CILP buffer pointer 440.

In some embodiments, the checkpoint control call sequence 450, includes, without limitation, a sequence of any number and/or types of control calls that the resource manager 410 submits or "makes" to the host interface 206 to checkpoint a context associated with the software application 150 or another software application. For explanatory purposes only, FIG. 4 depicts an example of the checkpoint control call sequence 450 via list indices C1-C5. Each of the list indices C1-C5 represents, without limitation, one or more control calls.

As denoted with the list index C1, to initiate the checkpoint control call sequence 450 for a given context, the resource manager 410 makes a control call to disable the compute engine included in the PPU 202. Disabling the compute engine prevents any other contexts from being scheduled on the compute engine. Subsequently, as denoted with the list index C2, the resource manager 410 makes a control call to preempt the context from the compute engine at the instruction level. In response, the compute engine stops executing in accordance with the context after an execution of a current instruction is compete (and before executing a next instruction). In some embodiments, the instruction that the compute engine is currently executing is included in a kernel associated with the context. In such embodiments, if the current instruction is not the last instruction in the kernel, then the checkpoint control call sequence 450 generates an intra-kernel checkpoint. As a consequence of the control call to preempt the context, the caches are drained, causing all cached application data to be written back to PP memory 204. Importantly, in response to the control call to preempt the context, the PPU 202 collects and writes the privileged register state 272 and the RAM chain state 274 to the context buffer 270.

As denoted with the list index C3, the resource manager 410 then makes a control call that requests a pointer to the CILP buffer 280. In response, and as described previously herein in conjunction with FIG. 2, trap handler routines executing on SMs 310 write the register file state 282 and the shared memory state 284 to the CILP buffer 280. The host interface 206 provides the resource manager 410 with a pointer to the CILP buffer 280 that the resource manager 410 stores as the CILP buffer pointer 440.

Subsequently, and as denoted with the list index C4, the resource manager 410 makes any number of control calls to store a copy of the context buffer 270 and a copy of the CILP buffer 280 in the checkpoint memory region via the checkpoint memory region pointer 420. More precisely, the resource manager 410 stores a copy of the context buffer 270 as checkpoint context buffer 292 and a copy of the CILP buffer 280 as checkpoint CILP buffer 294, respectively, that are included in a new checkpoint (e.g., the checkpoint 290).

In some other embodiments, the resource manager 410 can generate a new checkpoint in any technically feasible fashion based on any portions of any number and/or types of context state buffers instead of or in addition to the context buffer 270 and the CILP buffer 280.

As denoted with the list index C5, the resource manager 410 makes any number of control calls to re-enable the compute engine. In response, the compute engine executes the next instruction in accordance with the context. In some embodiments, the instruction at which the compute engine pauses execution and the instruction at which the compute engine subsequently resumes executing are included in the same set of instructions. Also in response to the control call(s) to re-enable the compute engine, the PPU 202 re-enables the compute engine, thereby allowing other contexts to be scheduled on the compute engine.

In some embodiments, the restart control call sequence 460, includes, without limitation, a sequence of any number and/or types of control calls that the resource manager 410 submits or makes to the host interface 206 to restart a context based on a previously-stored checkpoint (e.g., the checkpoint 290). For explanatory purposes only, FIG. 4 depicts an example of the restart control call sequence 460 via list indices R1-R5. Each of the list indices R1-R5 represents, without limitation, one or more control calls. As shown, the one or more control calls represented by the list indices R1-R3 and R5 are the same as the one or more control calls represented by the list indices C1-C3 and C5, respectively, As denoted with the list index R1, to initiate the restart control call sequence 460 for a given checkpoint for a given context, the resource manager 410 makes a control call to disable the compute engine included in the PPU 202. Disabling the compute engine prevents any other contexts from being scheduled on the compute engine. Subsequently, as denoted with the list index R2, the resource manager 410 makes a control call to preempt the context or another context from the compute engine at the instruction level. In response, the compute engine pauses execution after completely executing the instruction that the compute engine is currently executing. As a consequence of the control call to preempt the context, the caches are drained, causing all cached application data to be written back to PP memory 204. Importantly, in response to the control call to preempt the context, the PPU 202 collects and writes the privileged register state 272 and the RAM chain state 274 to the context buffer 270.

As denoted with the list index R3, the resource manager 410 then makes a control call that requests a pointer to the CILP buffer 280. In response, trap handler routines executing on SMs 310 write the register file state 282 and the shared memory state 284 to the CILP buffer 280. The host interface 206 provides the resource manager 410 with a pointer to the CILP buffer 280 that the resource manager 410 stores as the CILP buffer pointer 440.

Subsequently, and as denoted with the list index R4, the resource manager 410 overwrites the contents of the context buffer 270 and the CILP buffer 280 based on the previously-stored checkpoint and the architecture of the PPU 202. Accordingly, the resource manager 410 discards the previous contents of the context buffer 270 and the CILP buffer 280. In some embodiments, the resource manager 410 uses the context buffer pointer 430, the CILP buffer pointer 440, and the layout of data within the context buffer 270 and the CILP buffer 280 as per the architecture of the PPU 202 to properly restore the context state stored in the checkpoint context buffer 292 and the checkpoint CILP buffer 294, respectively. Notably, in some embodiments, the CILP buffer 280 is privileged, and the resource manager is able to overwrite the CILP buffer 280 because the resource manager operates in a privileged mode with respect to the PPU 202. In the same or other embodiments, the resource manager 410 can restore the context state stored via the previously-stored checkpoint into any number and/or types of context state buffers instead of or in addition to the context buffer 270 and the CILP buffer 280.

As denoted with the list index C5, the resource manager 410 makes any number of control calls to re-enable the compute engine. In response, the compute engine executes the next instruction in accordance with the previously-stored checkpoint, thereby rewinding the associated context to a previous point in time. Notably, in some embodiments, the instruction is within a kernel. Also in response to the control call(s) to re-enable the compute engine, the PPU 202 re-enables the compute engine included in the PPU 202, thereby allowing other contexts to be scheduled on the compute engine.

Note that the techniques described herein are illustrative rather than restrictive and may be altered without departing from the broader spirit and scope of the invention. Many modifications and variations on the functionality provided by the resource manager 410, the PPU 202, the SMs 310, the host interface 206, and the user mode driver 166, will be apparent to those of ordinary skill in the art without departing from the scope and spirit of the described embodiments.

In some other embodiments, the resource manager 410 can be any type of software program executing on any number and/or types of primary processors. In the same or other embodiments, the resource manager 410 can leverage any number and/or types of hardware features of any type of parallel processor in any technically feasible fashion to checkpoint and restart contexts. For instance, in some embodiments, the resource manager 410 can leverage any number and/or types of hardware features of the parallel processor to interrupt and/or preempt a context, preserve context data, and resume execution of a previously interrupted context. In the same or other embodiments, the resource manager 410 can store checkpoints in any number and/or types of memory associated with the parallel processor (e.g., device memory) and/or copy checkpoints to the system memory 104, any other type of memory, and/or any type of persistent storage.

In some embodiments, the techniques disclosed herein may be used with any accelerator or processor that can presently or in the future perform a context switch including, for example, a CPU, a GPU, an intelligence processing unit ("IPU"), neural processing unit ("NPU"), a TPU, a neural network processor ("NNP"), a data processing unit ("DPU"), a vision processing unit ("VPU"), an application specific integrated circuit ("ASIC"), a configured field-programmable gate array ("FPGA"), and the like.

Figure 5:
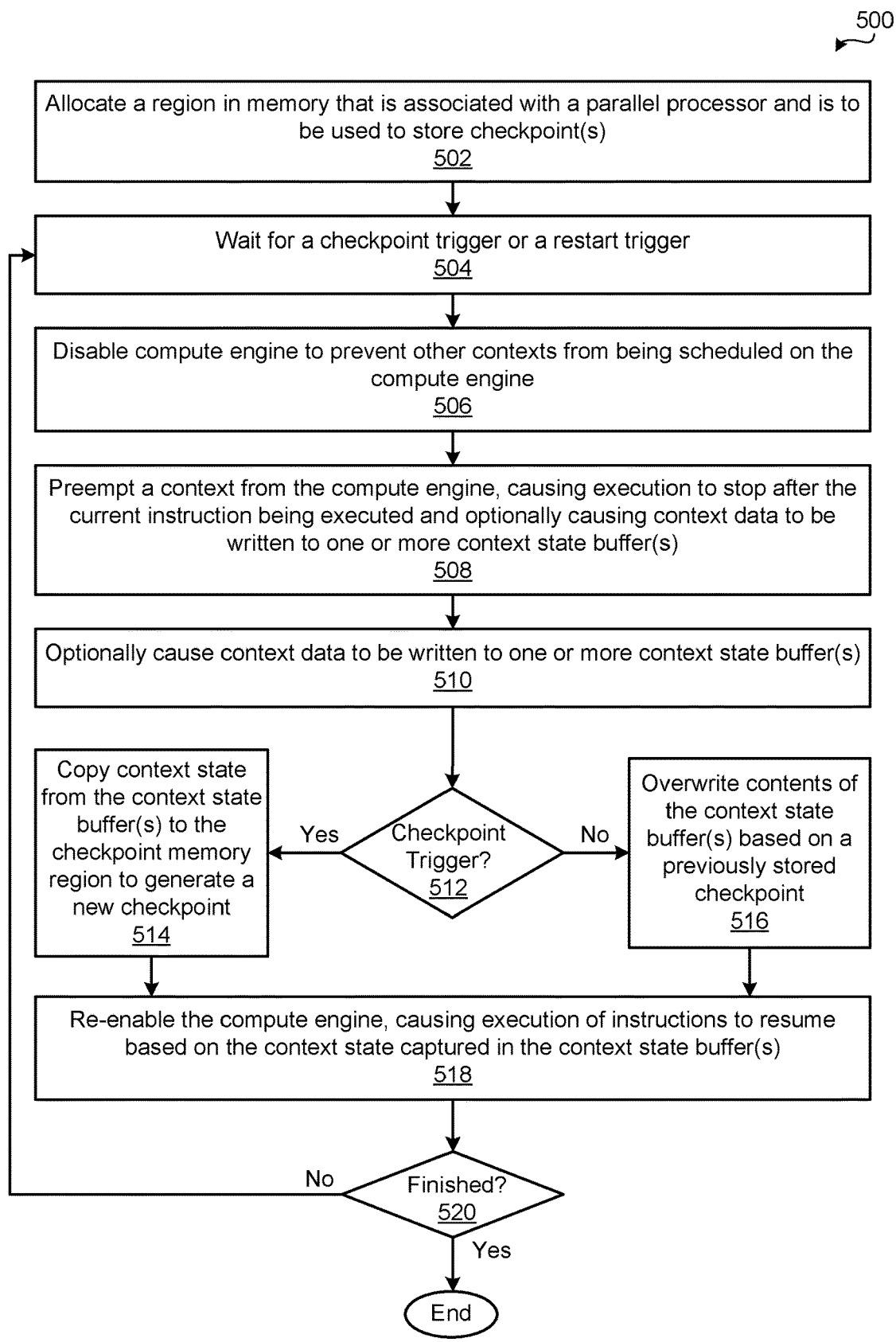
FIG. 5 is a flow diagram of method steps for checkpointing and restarting a context associated with an execution of a software application on a parallel processor, according to various embodiments.

FIG. 5 is a flow diagram of method steps for checkpointing and restarting a context associated with an execution of a software application on a parallel processor, according to various embodiments. Although the method steps are described in the context of the systems of FIGS. 1-4, persons skilled in the art will understand that any system configured to implement the method steps, in any order, falls within the scope of the present invention.

As shown, a method 500 begins at step 502, where the resource manager 410 allocates a region in a memory associated with a parallel processor that is to be used to store checkpoints for the software application 150 and optionally any number of other software applications. At step 504, the resource manager 410 waits for a checkpoint trigger or a restart trigger. At step 506, the resource manager 410 disables the compute engine to prevent other contexts from being scheduled on the compute engine.

At step 508, the resource manager 410 preempts a context from the compute engine, causing execution to stop after the current instruction being executed and optionally causes context data to be written to one or more context state buffer(s) (e.g., the context buffer 270). At step 510, the resource manager 410 optionally causes context data to be written to one or more context state buffer(s) (e.g., the CILP buffer 280).

At step 512, the resource manager 410 determines whether the resource manager 410 is responding to a checkpoint trigger. If, at step 512, the resource manager 410 determines that the resource manager 410 is responding to a checkpoint trigger, then the method 500 proceeds to step 514. At step 514, the resource manager 410 copies context state from the context state buffer(s) to the checkpoint memory region to generate a new checkpoint (e.g., the checkpoint 290). The method 500 then proceeds directly to step 518.

If, however, at step 512, the resource manager 410 determines that the resource manager 410 is not responding to a checkpoint trigger, then the method 500 proceeds directly to step 516. At step 516, the resource manager 410 overwrites contents of the context state buffer(s) based on a previously-stored checkpoint. For instance, in some embodiments, the resource manager 410 overwrites the contexts of the context buffer 270 and the CILP buffer 280 based on the checkpoint context buffer 292 and the checkpoint CILP buffer 294, respectively.

At step 518, the resource manager 410 re-enables the compute engine, causing execution of instructions to resume based on the context state captured in the context state buffer(s). At step 520, the resource manager 410 determines whether the software application 150 has finished executing. If, at step 520, the resource manager 410 determine that the software application 150 has not finished executing, then the method 500 returns to step 504, where the resource manager 410 waits for a new checkpoint trigger or restart trigger. If, however, at step 520, the resource manager 410 determines that the software application 150 has finished executing, then the method 500 terminates.

In sum, the disclosed techniques can be used to checkpoint and restart contexts of software applications at fine-grained intervals to enable rapid recovery from transient faults. In some embodiments, a software application executes as a process on a CPU and uses API(s) included in a programming platform software stack to configure a compute engine of a PPU to execute kernels. A resource manager that is included in the programming platform software stack operates in privileged mode with respect to the PPU. During initialization, the programming platform software stack creates a context that encapsulates the execution of the PPU-accelerated application on the PPU. The resource manager allocates a context buffer and a checkpoint memory region in PP memory and determines a checkpoint interval at which to repeatedly checkpoint the context. As the PPU-accelerated application executes, the resource manager leverages context switching hardware features of the compute engine to checkpoint the context and, as needed, to restart the context at a previously-stored checkpoint.

To checkpoint the context, the resource manager makes a series of control calls to the PPU. First, the resource manager makes a control call to disable the compute engine. Disabling the compute engine prevents instructions associated with any other contexts from being scheduled on the compute engine. The resource manager then makes a control call to preempt the context from the compute engine at the instruction level. In response, the PPU pauses execution at the instruction currently being executed in accordance with the context and writes the states of privileged registers and RAM chains to the context buffer. Subsequently, the resource manager makes a control call to retrieve a pointer to a CILP buffer. In response, a trap handler routine executing on the SMs writes the register file state and the shared memory state to the CILP buffer, and the host interface 206 provides the resource manager with a pointer to the CILP buffer.

The resource manager then makes any number of control calls to store a copy of the context buffer and a copy of the CILP buffer as a new checkpoint in the checkpoint memory region. Subsequently, the resource manager makes a control call to re-enable the compute engine. In response, the compute engine resumes executing the context at the next instruction to be executed in accordance with the context, and the PPU allows other contexts to be scheduled on the compute engine.

To restart a context based on a previously-stored checkpoint, the resource manager makes control calls to disable the compute engine, preempt the context from the compute engine at the instruction level, and retrieve a pointer for the CILP buffer. Notably, the offsets of individual register and RAM locations within the context buffer and the CILP buffer are defined by the architecture of the PPU. Using the pointer to the CILP buffer, the pointer to the context buffer, and the offsets of the individual register and RAM locations, the resource manager makes control calls to overwrite the contents of the context buffer and the CILP buffer with the contents of the previously-stored checkpoint. The resource manager then makes a control call to re-enable the compute engine. In response, the compute engine resumes executing the context at the previously-stored checkpoint at an instruction-level granularity, and the PPU allows other contexts to be scheduled on the compute engine.

At least one technical advantage of the disclosed techniques relative to the prior art is that, with the disclosed techniques, kernels can be preempted to enable intra-kernel checkpoint and intra-kernel restart of contexts. Accordingly, the amounts of data and compute time lost when a transient fault occurs while a parallel processor is executing a kernel can be reduced relative to prior art techniques. Another advantage of the disclosed techniques relative to the prior art is that checkpoints are stored in memory associated with the parallel processor instead of memory associated with the primary processor. Consequently, a degradation in the overall performance of a software application attributable to transferring checkpoint data between a primary processor and a parallel processor that are associated with prior art approaches can be eliminated with the disclosed techniques. These technical advantages provide one or more technological improvements over prior art approaches.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, Flash memory, an optical fiber, a portable compact disc read-only memory, an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for checkpointing a context associated with an execution of a software application on a parallel processor, the method comprising:
   determining that a kernel executing on a plurality of parallel processing elements included in the parallel processor is tagged to indicate that the kernel is enabled for intra-kernel checkpointing and restart;
   causing the plurality of parallel processing elements to stop executing a first plurality of instructions included in the kernel in accordance with the context before executing a next instruction included in the first plurality of instructions;
   causing the parallel processor to collect first state data associated with the context;
   generating a checkpoint based on the first state data, wherein the checkpoint is stored in a memory associated with the parallel processor; and
   causing the plurality of parallel processing elements to resume executing the first plurality of instructions included in the kernel at the next instruction in accordance with the context.

2. The computer-implemented method of claim 1, wherein causing the plurality of parallel processing elements to stop executing the first plurality of instructions comprises transmitting a control call to the parallel processor to preempt the context at an instruction level.

3. The computer-implemented method of claim 1, wherein the first plurality of instructions comprises a kernel included in the software application.

4. The computer-implemented method of claim 1, further comprising:
   while the plurality of parallel processing elements is executing a second plurality of instructions, determining that the context is to be restarted based on the checkpoint;
   causing the plurality of parallel processing elements to stop executing the second plurality of instructions; and
   causing the plurality of parallel processing elements to restart executing the first plurality of instructions at the next instruction in accordance with the checkpoint.

5. The computer-implemented method of claim 1, wherein causing the plurality of parallel processing elements to resume executing the first plurality of instructions comprises transmitting a control call to the parallel processor to re-enable the plurality of parallel processing elements.

6. The computer-implemented method of claim 1, further comprising, prior to causing the plurality of parallel processing elements to stop executing the first plurality of instructions, preventing the parallel processor from scheduling a second plurality of instructions in accordance with a second context on the plurality of parallel processing elements.

7. The computer-implemented method of claim 1, wherein causing the plurality of parallel processing elements to stop executing the first plurality of instructions further causes the parallel processor to collect second state data associated with the context.

8. The computer-implemented method of claim 7, wherein generating the checkpoint comprises copying the first state data and the second state data to the checkpoint.

9. The computer-implemented method of claim 1 wherein the first state data is associated with the plurality of parallel processing elements and comprises at least one of a per-thread register state or a shared memory state.

10. The computer-implemented method of claim 1, wherein the parallel processor comprises a parallel processing unit, a graphics processing unit, a tensor processing unit, or a multi-core central processing unit.

11. One or more non-transitory computer readable media including instructions that, when executed by one or more processors, cause the one or more processors to checkpoint a context associated with an execution of a software application on a parallel processor by performing steps of:
   determining that a kernel executing on a plurality of parallel processing elements included in the parallel processor is tagged to indicate that the kernel is enabled for intra-kernel checkpointing and restart;
   causing the plurality of parallel processing elements to stop executing a first plurality of instructions included in the kernel in accordance with the context before executing a next instruction included in the first plurality of instructions;
   causing the parallel processor to collect first state data associated with the context;
   generating a checkpoint based on the first state data, wherein the checkpoint is stored in a memory associated with the parallel processor; and
   causing the plurality of parallel processing elements to resume executing the first plurality of instructions included in the kernel at the next instruction in accordance with the context.

12. The one or more non-transitory computer readable media of claim 11, wherein causing the plurality of parallel processing elements to stop executing the first plurality of instructions comprises transmitting a control call to the parallel processor to preempt the context at an instruction level.

13. The one or more non-transitory computer readable media of claim 11, wherein the first plurality of instructions comprises a kernel included in the software application.

14. The one or more non-transitory computer readable media of claim 11, further comprising:
   while the plurality of parallel processing elements is executing a second plurality of instructions, determining that the context is to be restarted based on the checkpoint;
   causing the plurality of parallel processing elements to stop executing the second plurality of instructions; and
   causing the plurality of parallel processing elements to restart executing the first plurality of instructions at the next instruction in accordance with the checkpoint.

15. The one or more non-transitory computer readable media of claim 14, wherein the second plurality of instructions is associated with the context or a different context.

16. The one or more non-transitory computer readable media of claim 11, further comprising, prior to causing the plurality of parallel processing elements to stop executing the first plurality of instructions, determining that the context is to be checkpointed based on a checkpoint interval.

17. The one or more non-transitory computer readable media of claim 11, wherein causing the plurality of parallel processing elements to stop executing the first plurality of instructions further causes the parallel processor to collect second state data associated with the context.

18. The one or more non-transitory computer readable media of claim 17, wherein generating the checkpoint comprises copying the first state data and the second state data to the checkpoint.

19. The one or more non-transitory computer readable media of claim 17, wherein the second state data comprises at least one of a privileged register state or a flip-flop state.

20. A system comprising:
   a parallel processing memory storing a kernel;
   a parallel processor coupled to the parallel processing memory;
   one or more memories storing instructions; and
   one or more primary processors coupled to the one or more memories that, when executing the instructions:
      determines that the kernel executing on a plurality of parallel processing elements included in the parallel processor is tagged to indicate that the kernel is enabled for intra-kernel checkpointing and restart;
      causing the plurality of parallel processing elements to stop executing a first plurality of instructions included in the kernel in accordance with a context before executing a next instruction included in the kernel;
      causing the parallel processor to collect state data associated with the context;
      generating a checkpoint based on the state data, wherein the checkpoint is stored in the parallel processing memory; and
      causing the plurality of parallel processing elements to resume executing the first plurality of instructions included in the kernel at the next instruction in accordance with the checkpoint.

* * * * *